Jan. 29, 1963 G. W. GODDARD 3,076,189
MULTIPLE-SENSOR AIRBORNE RECONNAISSANCE SYSTEMS
Filed Oct. 16, 1958 3 Sheets-Sheet 1

INVENTOR.
GEORGE W. GODDARD
BY
ATTORNEYS

Jan. 29, 1963  G. W. GODDARD  3,076,189
MULTIPLE-SENSOR AIRBORNE RECONNAISSANCE SYSTEMS
Filed Oct. 16, 1958  3 Sheets-Sheet 3
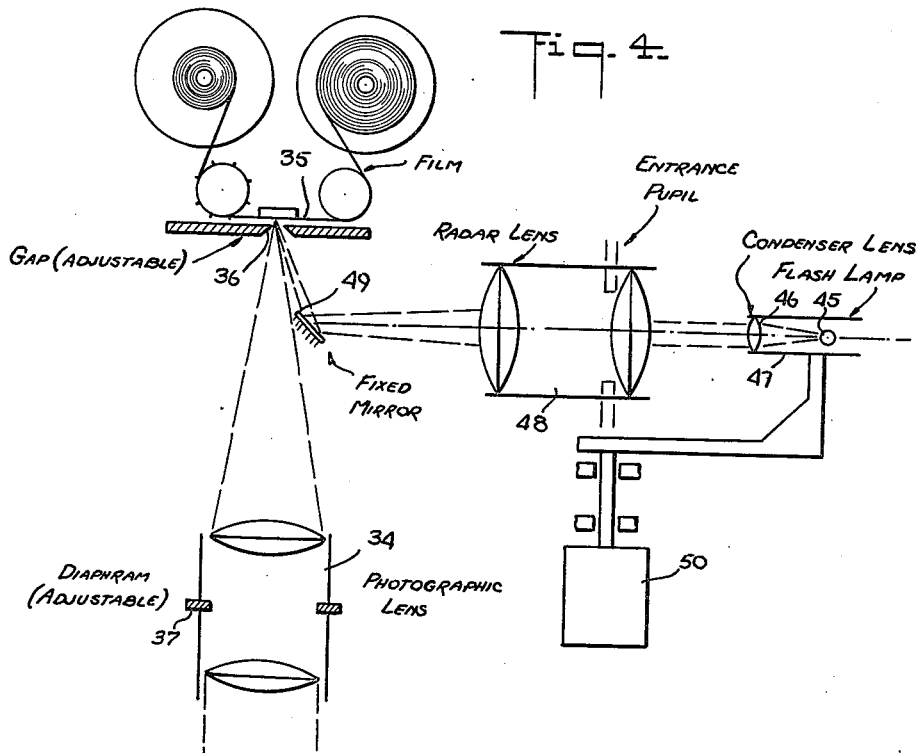
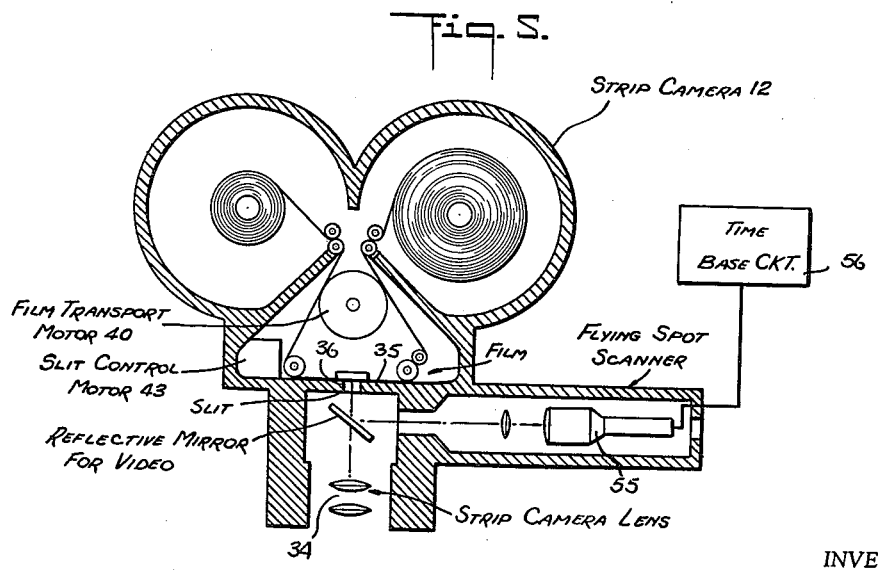
INVENTOR.
GEORGE W. GODDARD
BY
ATTORNEYS

United States Patent Office 3,076,189
Patented Jan. 29, 1963

3,076,189
MULTIPLE-SENSOR AIRBORNE RECONNAISSANCE SYSTEMS
George W. Goddard, Chevy Chase, Md., assignor to Bulova Research and Development Laboratories, Inc., Woodside, N.Y., a corporation of New York
Filed Oct. 16, 1958, Ser. No. 767,627
11 Claims. (Cl. 343—5)

The present invention relates generally to multiple-sensor airborne reconnaissance systems for the ground detection and location of military and other objectives, and more particularly to a system adapted to integrate in overlay form a photographic image with an image or indication obtained from a radar device adapted to respond to the presence of objects which are not optically visible.

As is well known, a conventional aerial reconnaissance camera is incapable of detecting military objectives which are obscured by the existence of natural growth on the terrain or by the use of camouflage techniques. Thus a reconnaissance camera will ordinarily not reveal the presence of enemy divisions which have been deployed in forest areas, nor will it locate camouflaged artillery, aerodromes, munition dumps and the like.

Radar reconnaissance techniques are known whereby radar pulses propagated toward the earth's surface are reflected by ground objects in varying degree, depending upon the specific nature of the object and its ground orientation, to provide radar indications. While attempts have been made to coordinate radar and photographic data, the results heretofore have not been of practical value, for the information obtained thereby could not be so integrated as to provide indications in simple and convenient form. For example, it has been known to apply along the frame edges of a photographic film radar pulse indications, each pulse having a height indicative of the intensity of reflection received from an object lying within the related photographs. This side-by-side relationship of photographic and radar data is difficult to interpret and is of little value in quick search missions by reconnaissance aircraft.

In view of the foregoing, it is the principal object of the present invention to provide a multiple-sensor data integration airborne system capable of rapidly identifying ground target areas which cannot reliably be detected by single sensor devices.

More particularly, it is an object of this invention to provide a system for concurrently producing aerial photo and radar recordings of the same target area, the data being collected and presented with equal scale distortion and orientation characteristics. Thus the invention eliminates inconvenient discrepancies relative to rapid interpretation and assessment of the data. It is a significant feature of this invention that the correlation of sensor recordings is such as to extract the maximum information therefrom.

Also another object of the invention is to provide an infra-red sensor in synchronism with a radar sensor to provide integrated recordings for accurate and reliable reconnaissance operations.

As applied to tactical military operations, use of a system in accordance with the invention affords a favorable air situation whereby constant air surveillance of the ground may be maintained regardless of attempted counter measures. Moreover, it provides data in suitable form which can be quickly evaluated and coordinated in close support of ground forces for target guidance and location.

For a better understanding of the invention as well as other objects thereof reference is made to the following detailed description to be read in connection with the accompanying drawing, wherein FIG. 1 is a schematic representation of an airborne multiple-sensor installation in accordance with the invention.

FIG. 4 is one preferred embodiment of the dual-image camera used in the installation, and FIG. 5 is another preferred embodiment of a dual-image camera.

Basic Theory

Figure 1:
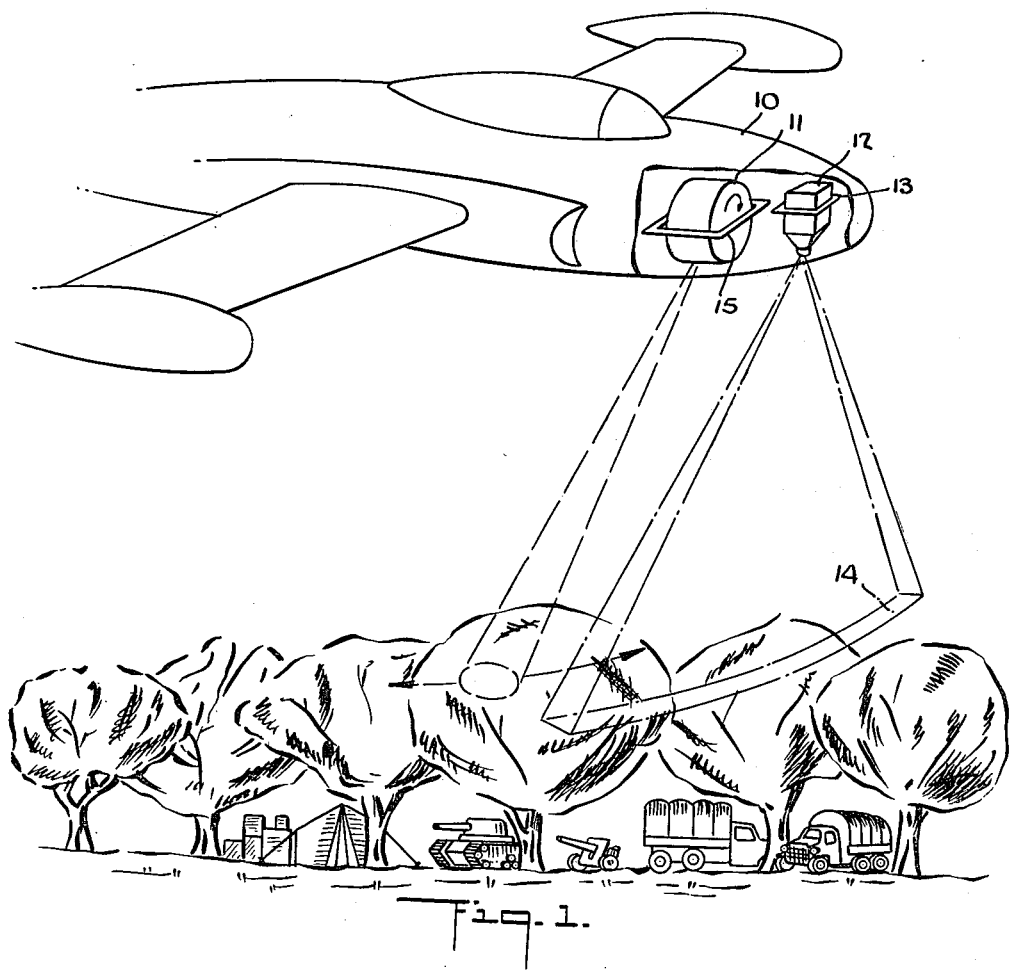

Referring now to FIG. 1 of the drawing there is shown a reconnaissance plane 10 having mounted thereon a radar system, generally designated by numeral 11, operating in coordination with a strip camera 12. The camera 12 is mounted on a stabilized platform 13 and is provided with a slit opening to expose the moving film therein to a strip 14 lying across the terrain in a direction perpendicular to the direction of flight. The radar system 11 is mounted on a separate stabilized platform 15 and projects a radar beam which is caused to scan across the same strip to provide simultaneous indications which are superimposed on the photographed film image. The radar beam therefore scans in a limited sector transverse to the line of flight.

Radar pulses propagated toward the terrain produce reflections which depend largely on the conductivity of the target or object. Metals have a relatively high conductivity and tend to produce stronger radar returns. The energy reflected by metallic objects is received by the radar system and converted to corresponding light pulses. The light pulses are projected on the photographic film which is also optically exposed by the camera. The energy reflected by metallic objects therefore forms a clear contrast against any background even when the background is constituted by semi-conductive materials, such as moist or wet surfaces.

In lieu of the conventional pictorial radar presentation of ground echoes, in a preferred form of the invention exclusive use is made during the scan of those ground returns whose energy exceeds a signal threshold corresponding to background level. Only those signal returns rising above the level of suppression are used for recording in the form of short dashes.

Figure 2:
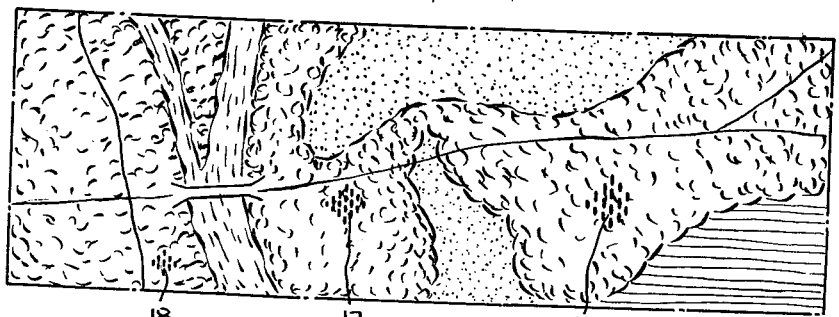
FIG. 2 is a typical record taken by the system.

Since the radar return dashes, as shown by the dash clusters 16, 17 and 18 in FIG. 2, are superimposed on the strip photograph taken at the same instant, each point of high radar reflectivity appears at its proper place with respect to ground. The film exposed in this fashion will then present the exact location of metallic targets without the need for special interpretive techniques.

In the strip camera, the rate of film travel, the width of the exposure slit and the diaphragm control are automatically adjusted. A variety of films may be used in accordance with the requirements of the mission, such as panchromatic emulsions, infra-red emulsions and camouflage detection film.

Each returning radar pulse above a predetermined minimum intensity is marked at the proper spot by means of a flash lamp and an optical scanner or by the use of a flying spot scanner, thereby tracing across the film the desired radar pattern.

The Multiple-Sensor System

Figure 3:
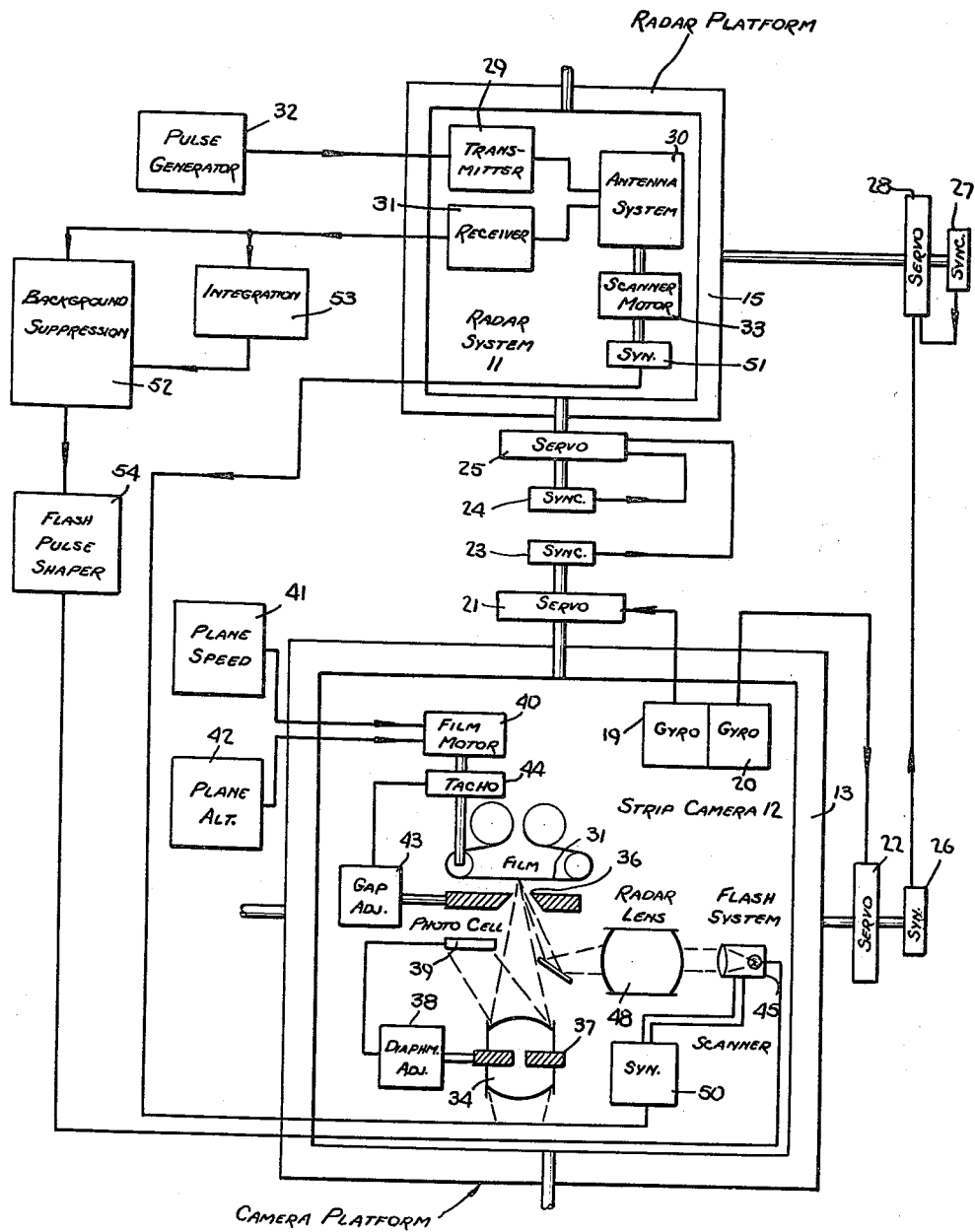
FIG. 3 is a block diagram of the installation.

Referring now to FIG. 3, the system is shown in block form, the radar device 11 being mounted in the stabilized platform 15 and the strip camera 12 being mounted in the stabilized platform 13.

The strip camera 12 requires stabilization to offset the effects of aircraft roll and pitch. Stabilization of yaw is not required for this application, for aircraft generally exhibit the lowest forces and a high moment of inertia about the vertical axis. The stabilization is accomplished by means of a gyro control of platform 13. This mount should be capable of accuracies to within one minute of arc despite short motions of the aircraft. Drift rate and absolute accuracy of such a mount do not influence the resolution significantly and are considered unimportant in this special application.

The scanning radar antenna also requires some form of stabilization. Such stabilization is provided by use of the slave platform 15 (without gyros) operatively coupled to the camera master platform 13 by two or four systems of synchros which then actuate the servo motors of the slave platform.

To effect stabilization of the camera platform, roll and pitch gyros 20 and 19, respectively are provided, the output of gyro 19 being applied to a servo mechanism 21 to effect correction of platform 13 as to pitch. The output of gyro 20 is fed to an independent servo mechanism 22 to effect correction as to roll. The platform 15 for the radar device is stabilized through a slave system coupled to the gyros. This is accomplished by a transmitting selsyn 23 mechanically coupled to the servo motor 21 and electrically linked to a receiving selsyn or synchro 24 for a servo motor 25, motor 25 effecting roll correction of platform 15. Similarly servo 22 is mechanically coupled to a selsyn 26 which is electrically linked to receiving selsyn 27 and servo motor 28 for correcting platform 15 as to pitch.

As is well known a synchro system is adapted to transmit positional information. The transmitter of the synchro, sometimes called a selsyn generator, has a rotor geared or otherwise linked to the mechanical element in motion. The synchro receiver has a rotor which is free to rotate and is caused to come into correspondence with the transmitter rotor.

The radar device 11 is constituted by a radar transmitter 29 whose output is fed to a scanning antenna 30 to project periodic exploratory pulses, the reflected or echo pulses intercepted by the antenna being fed to a radar receiver 31. Periodic pulses for the transmitter originate from a pulse generator 32. The mechanical oscillation of the antenna structure is effected by a scanning motor 33.

One important limitation of the reconnaissance system deals with the resolution capability of the radar components. High resolution can be attained if use is made of short wave lengths in conjunction with a reflector of a sufficient size.

The camera lens system 34 collects and focuses ground terrain information on the emulsion of a moving film 35 through an adjustable slit 36. The lens system is provided with an adjustable diaphragm 37 whose opening is controlled automatically by a mechanism 38, which may be any electromagnetic device responsive to signals from a photocell 39 when incident light falls thereon.

The speed of the film is varied by a film transport motor 40 which in turn is controlled by the ratio of aircraft ground velocity to aircraft altitude, as measured by speedometer and altimeter 41 and 42, respectively. The width of the camera slit is adjusted by a mechanism 43 responsive to a tachometer 44 mechanically coupled to the film advance motor 40 and is determined by the product of ground speed, scale and exposure time.

The film in passing over the camera exposure slit must be suitably marked with the radar return signals. By means of the marking device the radar signals are superimposed with the photographic ground detail. Only those radar ground returns substantially above an established suppression level are so recorded. This is effected by a background suppression or threshold circuit 52 operating in conjunction with an integrator 53, both coupled to the radar receiver 31 to produce output pulses which are suitably shaped in circuit 54. The threshold circuit 52 only passes signals above a predetermined general level, this level being determined by the integrator 53. Consequently, noise or background voltages which fall below this general level are excluded from the output of the threshold circuit. Each returning radar pulse from shaper 54 is then amplified and fed to a gas discharge lamp 45. By such means, the strong echoes are translated into short light flashes which are directly recorded on the film. The recording of the radar date is accomplished on the emulsion side of the film, thereby eliminating the difficulties of recording on film which may have anti-halation backing. In practice the discharge lamp may generate a flash of approximately 100 microseconds duration.

An optical mechanical scanning technique is used to distribute the flashes across the width of the film in synchronism with the scanning operation of the antenna. This is accomplished by means of the flash lamp 45, which is shown separately in FIG. 4, is placed at the focus of a small condenser lens 46 in a mounting tube 47 to produce a parallel beam of light. The mounting tube 47 is arranged to oscillate about an axis which passes through the center pupil of a second lens 48 (radar lens) which covers the same recording angle and has the same focal length as that of the photographic lens 34. This radar lens projects an image of the flash lamp through the exposure slit 36 to the film 35. A mirror or prism 49 is used to deflect the beam in such fashion as to prevent interference with the optical path of the camera lens. The mirror may be a half silvered surface or an off-center fully reflectioned element.

If the flash scanner rotates synchronously, and is in the proper angular position with the radar reflector, the flash signals can thus be made to traverse the length of the exposure slit. The scanner so synchronized will place the flash marks in their proper position during the scanning cycle. The synchronous movement of the optical scanner can be accomplished by use of a pair of synchros 50 and 51. The transmitting synchro 51 is driven by the radar scan drive motor 33. The receiving synchro 50 drives the optical scanner directly for no large forces are required for this purpose. To establish proper angular orientation initially, one synchro stator can be rotated.

The flash scanner will produce on the film a recording in the form of a short dash (black on film, white on the print) lying perpendicularly to the direction of the film. The width of each mark is equal to the width of the exposure slit.

In place of an optical mechanical scanning system for impressing the radar marks on the film, a flying spot electronic scanner 55 may be used as shown in FIG. 5. The scanning trace of the scanner may be caused to sweep across the cathode-ray tube screen by means of a suitable trigger and time base generator 56 operating in synchronism with the radar antenna. The arrangement is otherwise the same as in FIG. 4 and the flying spot data is superimposed on the camera information.

The strip camera may be in the form of an infra-red system rather than the usual photographic arrangement to provide a combined radar-infra-red photo overlay record. The information obtained in the plane may be relayed to a ground station by projecting the overlayed optical and radar data on the sensitive surface of a television camera, rather than on film, and permitting video signals to the ground station for presentation on a screen.

In order to have the radar information appear in dash form rather than as straight lines, a shutter may be provided in the optical system to break up the code lines of the radar. The same result can also be accomplished by cutting off the radar tube periodically. Similarly the infra-red code can be treated to provide dots or circles.

While there has been shown and described what are believed to be preferred embodiments of the invention, it is to be understood that many changes and modifications may be made therein without departing from the essential spirit of the invention as defined in the attached claims.

What is claimed is:

1. A multiple-sensor reconnaissance installation comprising an optical system for obtaining a photographic image of a given area and including a camera having a sensitive film therein, a radar system for scanning the same area to produce representative light indications, and means simultaneously to project said image and said indications in overlay relationship on said sensitive film in a corresponding scale to produce an overlay record.

2. An installation as set forth in claim 1, wherein said optical system includes a camera responsive to infra-red energy to provide a combined radar-infra red photo overlay record.

3. A multiple-sensor reconnaissance aircraft installation comprising an optical system for obtaining an image of a given strip area below the aircraft, the width of the strip being transverse to the line of flight, the optical system including a camera having a moving light-sensitive film therein, a radar system for scanning the same area to produce representative light indications, and means simultaneously to project said image and said indications in overlay relationship on said film in a corresponding scale to produce an overlay record.

4. An installation as set forth in claim 3 including means to coordinate the movement of said film with the flight of said aircraft.

5. A multiple-sensor reconnaissance installation comprising an optical system for obtaining a photographic image of a given area and including a camera having a sensitized film, a radar system for scanning the same area with periodic pulses to produce representative light indications, and means simultaneously to project said image and said indications in the same scale in an overlay pattern on said sensitized film.

6. An installation as set forth in claim 5, wherein said radar system includes a receiver to detect return pulses from said area, and means to suppress return pulses below a predetermined level.

7. A multiple-sensor aircraft reconnaissance installation comprising an optical system exposed to a given area in the terrain below the aircraft and including a camera having a film on which is projected the resultant photographic image, a first stabilized platform for supporting said optical system to offset the effects of aircraft roll and pitch, a radar system including a scanning antenna adapted to sweep said area with a radar beam, a second stabilized platform, means to convert return radar pulses obtained from said radar system into corresponding light values to produce a radar image, and means to project said radar image onto said film in overlay relationship with said photographic image and in the same scale therewith.

8. A multiple-sensor aircraft reconnaissance installation comprising an optical system exposed to a given strip area in the terrain below the aircraft and including a camera having a moving film on which is projected the resultant photographic image, a first stabilized platform for supporting said optical system to offset the effects of aircraft roll and pitch, a radar system including a scanning antenna adapted to sweep said area with a radar pulse beam, a second stabilized platform synchronized with the first platform, means to convert the return radar pulses obtained from said radar system into corresponding light values to produce a radar image, and means to project said radar image onto said film in overlay relationship with said photographic image.

9. An installation as set forth in claim 8, wherein said means to convert the return radar pulses into corresponding light values includes a gas discharge glow tube coupled to the output of the radar system, and means to oscillate said tube in synchronism with the scanning action of said antenna.

10. An installation as set forth in claim 8, wherein said means to convert the return pulses into corresponding light values includes a flying spot electronic tube and means to apply a sweep voltage thereto in synchronism with the scanning action of the antenna.

11. A multiple-sensor aircraft reconnaissance installation comprising an optical system exposed to a given strip area in the terrain below the aircraft and including a camera having a film on which is projected the resultant image, the movement of said film being coordinated with the flight of said aircraft, the width of said strip being transverse to the aircraft flight, a first stabilized platform for supporting said optical system to offset the effects of aircraft roll and pitch, a radar system including a scanning antenna adapted to sweep said area with a radar beam, a second stabilized platform, a synchro system to synchronize the second platform with the first platform, means to convert the return radar pulses obtained from said radar system into corresponding light values to produce a radar image, and means to project said radar image onto said film in overlay relationship with said photographic image to produce a dual image in corresponding scale.

References Cited in the file of this patent

UNITED STATES PATENTS

| | | |
|---|---|---|
| 2,462,859 | Grieg | Mar. 1, 1949 |
| 2,526,682 | Mulberger et al. | Oct. 24, 1950 |
| 2,705,319 | Dauber | Mar. 29, 1955 |
| 2,873,396 | Baldwin | Feb. 10, 1959 |